Sept. 27, 1960    G. R. HOFFMASTER    2,953,968
CLIP-ON GLASSES
Filed Sept. 19, 1958

INVENTOR.
George R. Hoffmaster.
BY
William J. Ruano
ATTORNEY.

United States Patent Office 2,953,968
Patented Sept. 27, 1960

2,953,968

CLIP-ON GLASSES

George R. Hoffmaster, Reading, Pa., assignor to The Electric Storage Battery Company, Philadelphia, Pa.

Filed Sept. 19, 1958, Ser. No. 762,128

1 Claim. (Cl. 88—41)

This invention relates on clip-on glasses and, more particularly, to clip-on sunglasses that clip on the bridge of the wearer's prescription eyeglasses. Clip-on glasses of the present invention are also suitable for use as safety protective glasses in industrial occupations for preventing glare and for preventing flying particles and the like from injuring regular glasses.

Clip-on sunglasses, of the type that clip onto the bridge of the user's regular eyeglasses and which are in the form of a spring loaded clip with two prongs that hold the sunglasses in place by pressing against the lenses of the sunglasses, are very well known in the art. However, such clip-on sunglasses have certain outstanding disadvantages, particularly the relatively complicated construction of their parts, necessitating high manufacture costs which seriously hamper extensive sales of such glasses in five and ten cent stores and the like. A further disadvantage of conventional clip-on glasses of this type is that they incorporate a leaf spring of unsightly character which lays on top of the cut-out portion of the bridge or on an abutment thereon which makes the spring readily visable to others, thus impairing the appearance, also which leaf spring is of special construction involving high cost. Other types which employ simple helical springs, have the disadvantage that the ends of such springs have to be embedded in the plastic bridge portion, therefore making it impossible to detachably remove them from the plastic frame in the event replacement of broken or weakened springs is necessary.

An object of my invention is to provide improvements in clip-on sunglasses such as to obviate the above-named disadvantages and whereby the cost of manufacture is considerably reduced as the result of simplicity of construction and operation of the parts.

A further object of my invention is to provide novel clip-on sunglasses which employ a simple helical spring which is hardly observable, therefore which will not detract from the appearance of the sunglasses and which will give the appearance of all-plastic sunglasses and enable said spring to be detachably removed in the event of breakage requiring replacement of the spring.

A still further object of my invention is to provide clip-on sunglasses of a very simple construction in which the parts are extremely simple and inexpensive to manufacture in mass production.

Other objects and advantages of my invention will become more apparent from a study of the following description taken with the accompanying drawing wherein.

Figure 1:
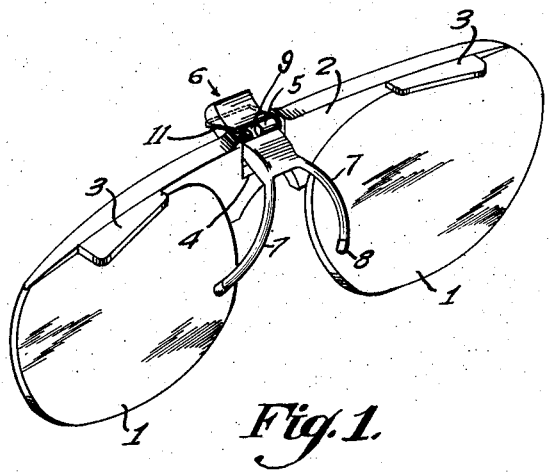
Fig. 1 is a perspective view of a pair of clip-on sunglasses embodying the principles of the present invention.

Referring more particularly to Fig. 1 of the drawing, numerals 1, 1 denote plastic lenses which may be either colored, such as for use as sunglass lenses, or transparent (or colored) and of hard, plastic material, in the event the glasses are to be used as protective glasses for workmen in industrial occupations. Lenses 1 are integrally secured to plastic bridge 2 which is provided at the top portions with ears or lugs 3 which are adapted to rest on top of the bridge of a pair of regular prescription glasses. The top central portion of the bridge is provided with a slot 4. On the side walls of the slot 4 there are integrally formed, small solid plastic, cylindrical portions or bearings 5 which will serve as pivots for the clip element 6. Clip element 6 comprises a pair of prongs 7 which have, at the ends thereof, tips 8, 8 of relatively soft plastic material which tips are adapted to be yieldably pressed against the inside surfaces of the lenses 1, 1 or of the lenses of the prescription glasses (not shown).

Figure 2:
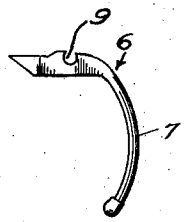
Fig. 2 is a side view of the clip shown in Fig. 1.
Figure 3:
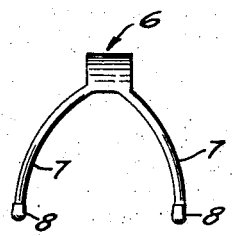
Fig. 3 is a rear view of the clip shown in Figs. 1 and 2.
Figure 4:
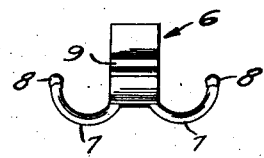
Fig. 4 is a top view of the clip.
Figure 5:
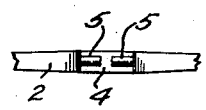
Fig. 5 is a fragmentary, top view of the bridge portion of the plastic frame showing the integral bearings serving as pivots for the clip.
Figure 6:
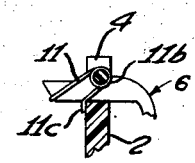
Fig. 6 is a fragmentary, vertical cross-sectional view through one of the bearings shown in Fig. 5 to more clearly illustrate the manner in which the spring yieldingly urges the clip prongs in position against the glasses.

The essential features of the present invention reside in the particular spring pivot construction of the sunglasses as illustrated more particularly in Figs. 2, 5 and 6, and especially to the manner the pivot is provided and the spring is applied in a detachable fashion so as to permit detachment of the clip and replacement of the spring when necessary.

At the top of clip element 6 there is provided a semicircular, or preferably a slightly larger than semi-circular notch 9 into which bearings 5, 5 are snugly and snap fitted so as to form a pivot for the clip element. Thus a relatively tight but still detachable fit is provided between bearings 5 and slot 9 such as to enable detachment of the clip by merely pressing vertically downwardly on the top portion of the clip 6, as viewed in Fig. 1, to allow separation of the notch 9 from the bearing elements 5.

Another unique feature of the present invention resides in the manner that a simple helical spring 11 is attached to form a spring pivot and at the same time avoid the necessity of embedding the end-portions thereof in the plastic material, so as to allow readily replaceability when necessary. More specifically, wire spring 11 is provided with a U-shaped portion 11a which fits around the front portion of the clip and engages the surface underneath the clip. The end portions 11b of the spring encircle the pivots or bearings 5 whereas the extreme ends 11c project forwardly of bridge 2 and project vertically downwardly into engagement with the front surface of the bridge portion, therefore are hardly visible from the front of the glasses, particularly since the ends 11c practically coincide with the side walls of the notch 4 and appear merely as outlines of such side walls.

In operation, when it is desired to clip the sunglasses, onto prescription glasses, the top portion of clip 6 is depressed, winding spring coils 11b and separating the prongs 7 from the lenses 1, which enables fitting of the sunglasses over such prescription glasses and clipping onto the bridge thereof in a well known manner. To remove the clip-on glasses, it is necessary merely to again depress the top portion of clip 6 to relieve the spring pressure 7 of the prongs against the inside surface of the prescription glasses.

In the event of breakage of spring 11 requiring replacement, it is necessary merely to depress the top of clip element 6 so as to separate notch 9 from the bearings 5 and thereafter pass the top portion of clip 6 underneath the bearings and through the slot 4, whereby the spring is readily accessible for easy removal and replacement.

Thus it will be seen that I have provided a relatively inexpensive pair of clip-on glasses, having exceedingly simple parts which are easy and cheap to manufacture, therefore which lend themselves to mass production, and at the same time which are of such construction as to enable quick detachment of the clip from the glasses and to enable replacement of the spring in the event it is broken; furthermore I have provided clip-on sunglasses which are devoid of unsightly, flat springs of special construction.

While I have illustrated and described a single specific embodiment of my invention, it will be understood that this is by way of illustration only, and that various changes and modifications may be made within the contemplation of my invention and within the scope of the following claim.

I claim:

Clip-on glasses comprising lens portions integrally secured together by a plastic bridge portion, integral ears extending rearwardly from the bridge portion above said lens portions for resting on the top of prescription glasses to which the clip-on glasses are to be attached, a central rectangular slot formed in the top of said bridge portion, cylindrical bearings integrally formed on and extending from the sidewalls of said slot, a plastic clip element comprising a pair of downwardly extending prongs, and comprising a top portion extending through said slot, said top portion of the clip being provided on its top surface with a slightly greater than semi-circular, lateral groove into which said bearings are snugly fitted to provide a snap-fit which is readily detachable by depressing the top portion of the clip away from said bearings, a wire coiled spring having a substantially U-shaped central portion which snugly embraces the lower surface of said top portion of the clip element and having adjoining portions which are wrapped around said bearings, also having end portions which extend substantially vertically downwardly from said bearings substantially in contact with the sidewalls of said slot with the extremities of said spring bearing against the front surface portion of said bridge portion immediately adjacent said sidewalls to provide an anchor, so as to yieldingly urge said clip element so that its lateral groove will be biased upwardly in seating engagement with said bearings, and so as to yieldingly urge the ends of said prongs against the rear surfaces of said lens portions, and whereby said spring is substantially concealed and may be readily detached and replaced.

References Cited in the file of this patent

UNITED STATES PATENTS

| | | |
|---|---|---|
| 2,584,000 | Ehlert et al. | Jan. 29, 1952 |
| 2,671,379 | Eloranta | Mar. 9, 1954 |
| 2,737,848 | Crane | Mar. 13, 1956 |